(12) United States Patent
Shin et al.

(10) Patent No.: US 6,958,743 B2
(45) Date of Patent: Oct. 25, 2005

(54) ARRAY SUBSTRATE FOR LIQUID CRYSTAL DISPLAY DEVICE HAVING REDUNDANCY LINE AND FABRICATING METHOD THEREOF

(75) Inventors: Woo-Sup Shin, Gyeongsangbuk-do (KR); Choong-Un Lee, Daegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 492 days.

(21) Appl. No.: 10/314,375

(22) Filed: Dec. 9, 2002

(65) Prior Publication Data

US 2003/0122762 A1 Jul. 3, 2003

(30) Foreign Application Priority Data

Dec. 29, 2001 (KR) ........................ 10-2001-0087771

(51) Int. Cl.[7] ............................ G09G 3/36; G09G 5/00
(52) U.S. Cl. ............................ 345/93; 345/87; 345/90; 345/204; 345/206
(58) Field of Search .............................. 345/87, 90–98, 345/204–207; 349/122–123, 128–129, 138, 349/151–158

(56) References Cited

U.S. PATENT DOCUMENTS

| | | |
|---|---|---|
| 2003/0122989 A1 * | 7/2003 | Park et al. .................... 349/43 |
| 2004/0109102 A1 * | 6/2004 | Chang et al. ................. 349/44 |
| 2005/0041189 A1 * | 2/2005 | Hong et al. ................. 349/149 |

* cited by examiner

Primary Examiner—Vijay Shankar
(74) Attorney, Agent, or Firm—McKenna Long & Aldridge LLP

(57) ABSTRACT

An array substrate for a liquid crystal display device includes: a substrate; a gate line on the substrate; a gate insulating layer on the gate line; a data line on the gate insulating layer, the data line crossing the gate line; a data link line extending from the data line; a data pad connected to the data link line; a redundancy line adjacent to the data link line; a passivation layer covering the data link line, the data pad and the redundancy line, the passivation layer having a data link line contact hole exposing the data link line, first and second redundancy line contact holes exposing the redundancy line and a data pad contact hole exposing the data pad; a data pad terminal connected to the data pad through the data pad contact hole and to the redundancy line through the first redundancy line contact hole; a redundancy electrode connected to the redundancy line through the second redundancy line contact hole and to the data link line through the data link line contact hole; and a pixel electrode on the passivation layer.

20 Claims, 5 Drawing Sheets

ARRAY SUBSTRATE FOR LIQUID CRYSTAL DISPLAY DEVICE HAVING REDUNDANCY LINE AND FABRICATING METHOD THEREOF

The present invention claims the benefit of the Korean Patent Application No. P2001-87771 filed in Korea on Dec. 29, 2001, which is hereby incorporated by reference in its entirety.

BACKGROUND OF THE INVENTION

1. Field of the Invention

The present invention relates to a liquid crystal display device, and more particularly, to an array substrate for a liquid crystal display device and a fabricating method thereof.

2. Discussion of the Related Art

Due to their small size, light weight, and low power consumption, flat panel display (FPD) devices have been the subject of much research in the field of information technology. Among the many types of FPD devices, liquid crystal display (LCD) devices, which are used in devices such as notebook personal computers (PCs) and desktop PCs, have excellent color, resolution, and display characteristics. Generally, a liquid crystal display (LCD) device uses optical anisotropy and polarization properties of liquid crystal molecules. The liquid crystal molecules have a definite orientational order in alignment resulting from their thin and long shapes. The alignment direction of the liquid crystal molecules can be controlled by applying an electric field to the liquid crystal molecules. In other words, as the intensity of the electric field is changed, the alignment of the liquid crystal molecules also changes. Since incident light through liquid crystal is refracted based on an orientation of the liquid crystal molecules, due to the optical anisotropy of the aligned liquid crystal molecules, an intensity of the incident light can be controlled and images can be displayed.

Among the various type of LCD devices commonly used, active matrix LCD (AM-LCD) devices where thin film transistors (TFTs) and pixel electrodes connected to the TFTs are disposed in matrix have been developed because of their high resolution and superiority in displaying moving images. In the AM-LCD device, the pixel electrode and a common electrode are formed on first and second substrates, respectively. A vertical electric field generated between the pixel electrode and the common electrode drives a liquid crystal layer between the pixel electrode and the common electrode. The AM-LCD device has properties of high transmittance and high aperture ratio.

FIG. 1 is a schematic cross-sectional view of a related art liquid crystal display device. As shown in FIG. 1, an upper substrate 12 and a lower substrate 14 face and are spaced apart from each other. The upper substrate 12 and the lower substrate 14 are referred to as a color filter substrate and an array substrate, respectively. A liquid crystal layer 16 is interposed between the upper and lower substrates 12 and 14. An active region "A" includes a pixel region "P" and a thin film transistor (TFT) "T" on the lower substrate 14. Further, a data link region "B" adjacent to the active region "A" and a data pad region "C" adjacent to the data link region "B" are defined on the lower substrate 14. The thin film transistor (TFT) "T" includes a gate electrode 18, a semiconductor layer 22, and source and drain electrodes 24 and 26 on an inner surface of the lower substrate 14 in the active region "A."

A pixel electrode 32 connected to the TFT "T" is formed in the pixel region "P." A black matrix 34, a color filter layer 35, an overcoat layer 38 and a common electrode 40 are sequentially formed on an inner surface of the upper substrate 12. The black matrix 34 is formed at the data link region "B" and extended over the TFT "T." The color filter layer 35 including red (R), green (G) and blue (B) colors that are alternately disposed and overlaps the black matrix 34, where one color corresponds to one pixel region. First and second orientation films (not shown) may be formed on the pixel electrode 32 and the common electrode 40, respectively.

A liquid crystal layer 16 is interposed between the first and second orientation films. A spacer 42 is used in the liquid crystal layer 16 to maintain a precise and uniform gap between the upper and lower substrates 12 and 14. A seal pattern 44 is formed between the first and second orientation films of the data link region "B" to maintain a gap for injection of a liquid crystal material and prevent leakage of the injected liquid crystal material. A data pad portion "D" is formed on the lower substrate 14 of the data pad region "C" for connecting the liquid crystal panel to an external circuit. The data pad portion "D" is connected to a data line 25, which is connected to the source electrode 24 of the TFT "T" in FIG. 1, to apply a driving signal to pixels of the liquid crystal panel. First and second polarizing plates 31 and 35 are formed on an outer surface of the upper and lower substrates 12 and 14, respectively. A backlight is disposed under the second polarizing plate 35.

FIG. 2 is a schematic plan view of a related art liquid crystal display device. As shown in FIG. 2, a data line 50 in an active region "A" connects to a data link line 52 in a data link region "B". A data pad 54 in a data pad region "C" also is connected to the data link region "B". The data link region "B" is outside of the active region "A" and the data pad region "C" is outside of the data link region "B." The data pad 54 has a larger width than the data link line 52. A data pad terminal 58 covers the data pad 54 and is connected to the data pad 54 through data pad contact holes 56.

A process of forming a liquid crystal panel from attached upper and lower glass substrates includes a process of cutting the attached substrates into a unit panel. As shown in FIG. 1, the data link region is disposed inside of the data pad region. Glass substrates have a high degree of hardness, and the cutting process is performed by scratching with an ultra hard alloy and breaking the glass substrates with an exterior impact. Since a cutting plane of the upper substrate is disposed over the data link region of the lower substrate, a glass chip generated during the cutting process can scratch the data link line 52 such that the data pad 54 is disconnected from the data line 50.

FIG. 3 is a schematic cross-sectional view taken along a line III—III of FIG. 2. As shown in FIG. 3, a gate insulating layer 20 is formed on a substrate 14 and a data link line 52 is formed on the gate insulating layer 20. A passivation layer 28 is formed on the data link line 52 and the gate insulating layer. The data link line 52 is made of the same material as the data line 50 (of FIG. 2). Generally, the gate insulating layer 20 and the passivation layer 28 are made of silicon nitride ($SiN_x$) or silicon oxide ($SiO_x$).

In a gate pad portion (not shown), a gate link line is made of the same material as a gate line, the gate link line is covered with the gate insulating layer and the passivation layer. Accordingly, the gate link line is not susceptible to the glass chip. However, in the data pad portion, since the data link line has a single layer and only the passivation layer covers the data link line, a break in the data link line due to a glass chip generated during panel cutting can easily occur.

SUMMARY OF THE INVENTION

Accordingly, the present invention is directed to an array substrate for a liquid crystal display device that substantially obviates one or more of the problems due to limitations and disadvantages of the related art.

An object of the present invention is to provide an array substrate for a liquid crystal display device in which production yield is improved by preventing disconnection of a data line from a data pad.

Another object of the present invention is to provide a data pad portion where a disconnection problem is solved without an additional repair process.

Another object of the present invention is to provide a data pad portion having a redundancy repair line.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a substrate; a gate line on the substrate; a gate insulating layer on the gate line; a data line on the gate insulating layer, the data line crossing the gate line; a data link line extending from the data line; a data pad connected to the data link line; a redundancy line adjacent to the data link line; a passivation layer covering the data link line, the data pad and the redundancy line, the passivation layer having a data link line contact hole exposing the data link line, first and second redundancy line contact holes exposing the redundancy line and a data pad contact hole exposing the data pad; a data pad terminal connected to the data pad through the data pad contact hole and to the redundancy line through the first redundancy line contact hole; a redundancy electrode connected to the redundancy line through the second redundancy line contact hole and to the data link line through the data link line contact hole; and a pixel electrode on the passivation layer.

In another aspect, a fabricating method of an array substrate for a liquid crystal display device includes forming a gate line on a substrate; forming a gate insulating layer on the gate line; forming a data line on the gate insulating layer, the data line crossing the gate line; forming a data link line extending from the data line; forming a data pad connected to the data link line; forming a redundancy line adjacent to the data link line; forming a passivation layer covering the data link line, the data pad and the redundancy line, the passivation layer having a data link line contact hole exposing the data link line, first and second redundancy line contact holes exposing the redundancy line and a data pad contact hole exposing the data pad; forming a data pad terminal connected to the data pad through the data pad contact hole and to the redundancy line through the first redundancy line contact hole; forming a redundancy electrode connected to the redundancy line through the second redundancy line contact hole and to the data link line through the data link line contact hole; and forming a pixel electrode on the passivation layer.

In another aspect a liquid crystal display device has a lower substrate that includes a substrate, a gate line on the substrate, a gate insulating layer on the gate line, a data line on the gate insulating layer, the data line crossing the gate line, a data link line extending from the data line, a data pad connected to the data link line, a redundancy line adjacent to the data link line, a passivation layer covering the data link line, the data pad and the redundancy line, the passivation layer having a data link line contact hole exposing the data link line, first and second redundancy line contact holes exposing the redundancy line and a data pad contact hole exposing the data pad, a data pad terminal connected to the data pad through the data pad contact hole and to the redundancy line through the first redundancy line contact hole, a redundancy electrode connected to the redundancy line through the second redundancy line contact hole and to the data link line through the data link line contact hole, and a pixel electrode on the passivation layer; an upper substrate having a common electrode; and liquid crystal positioned between the upper and lower substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
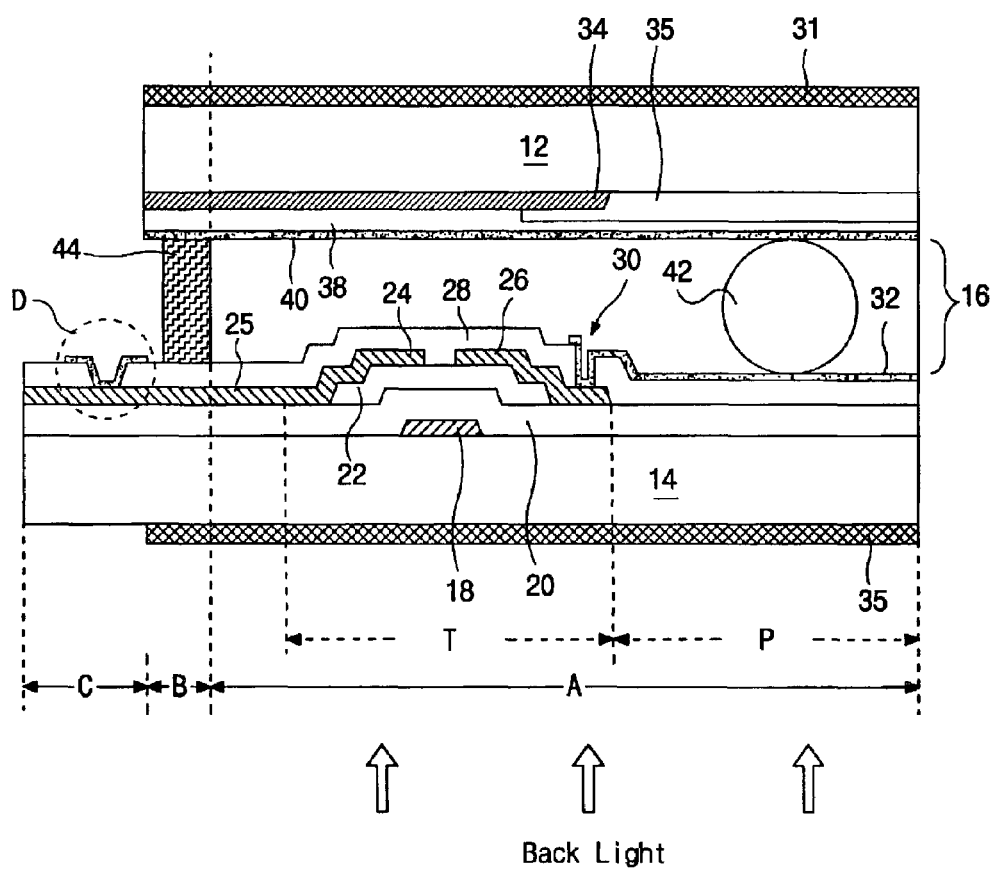
FIG. 1 is a schematic cross-sectional view of a related art liquid crystal display device.
Figure 2:
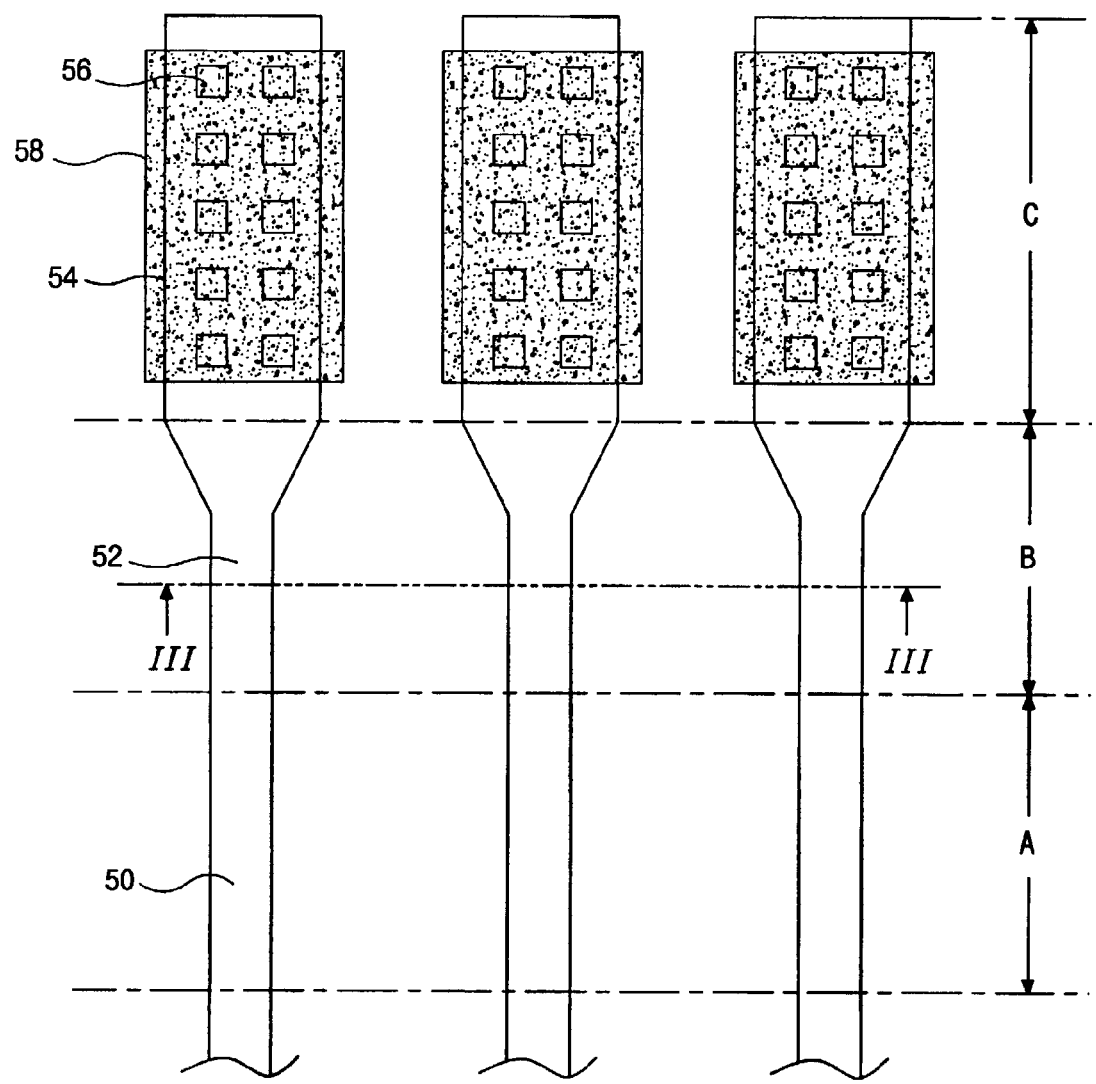
FIG. 2 is a schematic plan view of a related art liquid crystal display device.
Figure 3:
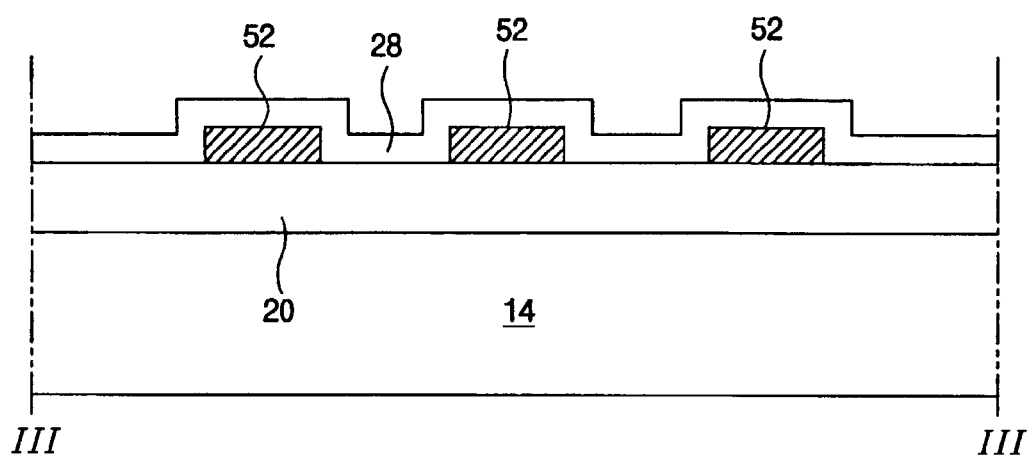
FIG. 3 is a schematic cross-sectional view taken along the line III—III of FIG. 2.
Figure 4:
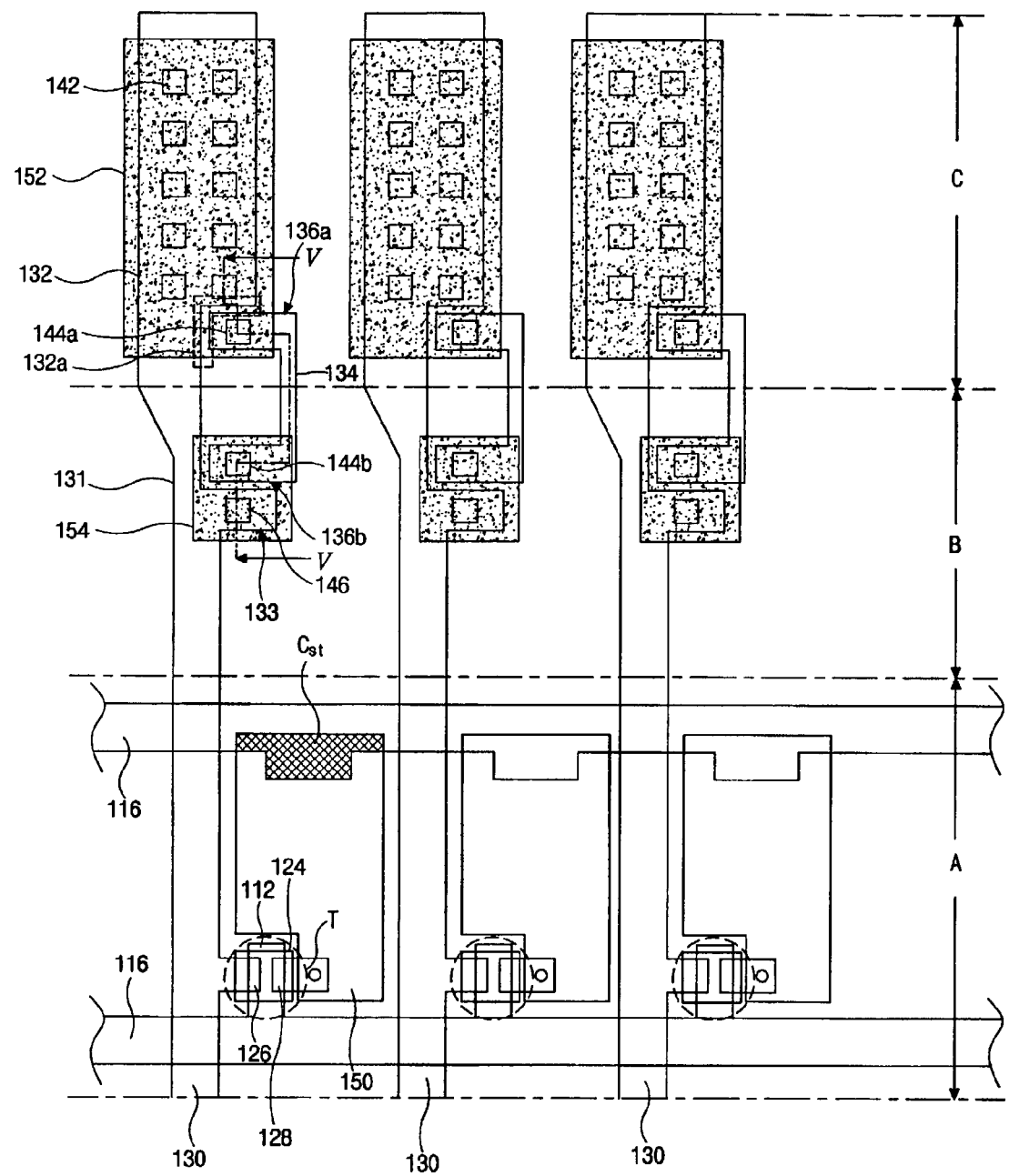
FIG. 4 is a schematic plan view of an array substrate for a liquid crystal display device according to an embodiment of the present invention.

FIG. 4 is a schematic plan view of an array substrate for a liquid crystal display device according to an embodiment of the present invention. As shown in FIG. 4, an array substrate has an active region "A" where images are displayed, a pad region "C" that is about the periphery of the active region "A" and a link region "B" that is a border region between the active region "A" and the pad region "B." In the active region "A," a gate line 116 is disposed along a first direction and a data line 130 is disposed along a second direction crossing the first direction. A thin film transistor (TFT) "T" is disposed at a cross of the gate line 116 and the data line 130 and a pixel electrode 150 is connected to the TFT "T." The TFT "T" includes a gate electrode 112, a semiconductor layer 124, and source and drain electrodes 126 and 128. A portion of the pixel electrode 150 overlapping the gate line 116 constitutes a storage capacitor "$C_{ST}$." A data pad 132 having a larger width than the data line 130 is formed in the pad region "C." A data link line 131 is formed in the link region "B" between the data line 130 and the data pad 132.

Redundancy line 134 is also formed in the link region "B" between the data line 130 and the data pad 132. The redundancy line 134 is made of the same material as the gate line 116. The redundancy line 134 has first and second connection portions 136a and 136b for connection with the data pad 132 and the data link line 131, respectively. The data pad 132 has a concave portion 132a corresponding to the adjacent first connection portion 136a and the data link line 131 has a protruding portion 133 adjacent to the second connection portion 136b. The data pad 132, the data link line 131 and the redundancy line 134 are exposed through data pad contact holes 142, a data link line contact hole 146, and first and second redundancy line contact holes 144a and 144b, respectively. A data pad terminal 152 is connected to the data pad 132 through the data pad contact holes 142 and to the first connection portion 136a of the redundancy line 134 through the first redundancy line contact hole 144a. A redundancy electrode 154 is connected to the second connection portion 136b of the redundancy line 134 through the second redundancy line contact hole 144b and to the protruding portion 133 of the data link line 131 through the data link line contact hole 146. The data pad terminal 152 and the redundancy electrode 154 are made of the same material as the pixel electrode 150. The connection structure of the redundancy line 134, the data pad 132 and the data link line 131 can be modified in various ways.

Figure 5:
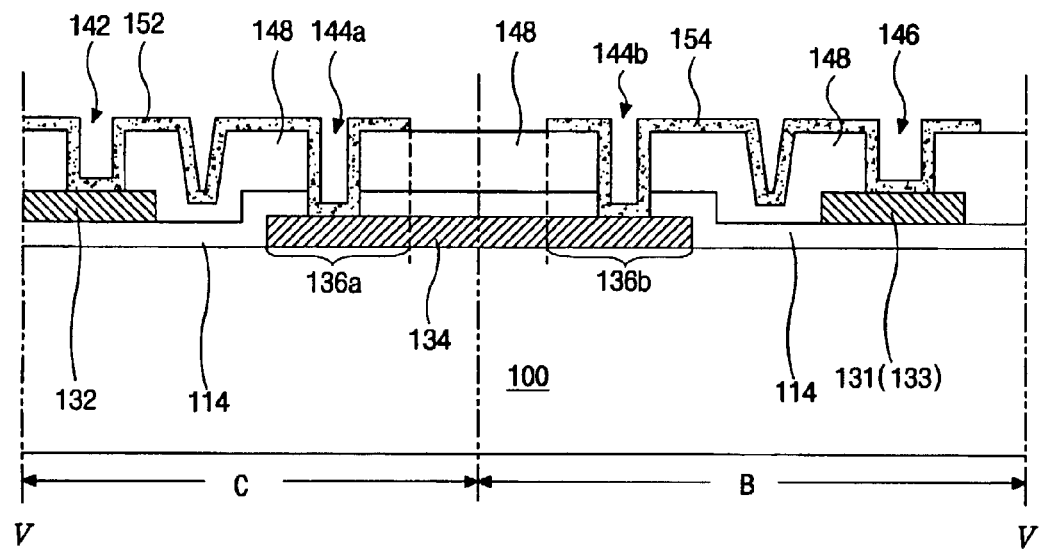
FIG. 5 is a schematic cross-sectional view taken along a line V—V of FIG. 4.

FIG. 5 is a schematic cross-sectional view taken along a line V—V of FIG. 4. As shown in FIG. 5, a redundancy line 134 is formed on a substrate 100 and a gate insulating layer 114 is formed on the redundancy line 134. The redundancy line 134 includes first and second connection portions 136a and 136b. A data pad 132 and a protruding portion 133 of a data link line 131 are formed on the gate insulating layer 114 and spaced apart from the redundancy line 134. A passivation layer 148 is formed over the data pad 132, the redundancy line 134 and the data link line 131. The passivation layer 148 has a data pad contact hole 142 exposing the data pad 132, first and second redundancy line contact holes 144a and 144b respectively exposing the first and second connection portions 136a and 136b of the redundancy line 134, and a data link line contact hole 146 exposing the protruding portion 133 of the data link line 131. A data pad terminal 152 and a redundancy electrode 154 are formed on the passivation layer 148.

The data pad terminal 152 is connected to the data pad 132 through the data pad contact hole 142 and to the first connection portion 136a of the redundancy line 134 through the first redundancy line contact hole 144a. The redundancy electrode 154 is connected to the second connection portion 136b of the redundancy line 134 through the second redundancy contact hole 144b and to the protruding portion 133 of the data link line 131 through the data link line contact hole 146. Since the redundancy line 134 is covered with a double layer of the gate insulating layer 114 and the passivation layer 148, the redundancy line 134 can reliably function as a data link line connecting the data pad 132 and the data line 130 even when the data link line 131 is broken between the protruding portion 133 and the data pad 132.

Therefore, an external signal can be applied to the LCD panel through the redundancy line of the same material as the gate line even when the data link line is broken due to an exterior force from a glass chip generated during the cutting of the LCD panel. Therefore, an LCD device of high reliability and high production yield can be provided.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
   a substrate;
   a gate line on the substrate;
   a gate insulating layer on the gate line;
   a data line on the gate insulating layer, the data line crossing the gate line;
   a data link line extending from the data line;
   a data pad connected to the data link line;
   a redundancy line adjacent to the data link line;
   a passivation layer covering the data link line, the data pad and the redundancy line, the passivation layer having a data link line contact hole exposing the data link line, first and second redundancy line contact holes exposing the redundancy line and a data pad contact hole exposing the data pad;
   a data pad terminal connected to the data pad through the data pad contact hole and to the redundancy line through the first redundancy line contact hole;
   a redundancy electrode connected to the redundancy line through the second redundancy line contact hole and to the data link line through the data link line contact hole; and
   a pixel electrode on the passivation layer.

2. The array substrate according to claim 1, wherein the substrate has an active region where images are displayed, a pad region on a periphery of the active region and a link region being a border between the active region and the pad region.

3. The array substrate according to claim 2, wherein the gate line is disposed in the active region, the data link line is disposed in the link region and the data pad is disposed in the pad region.

4. The array substrate according to claim 1, further comprising a thin film transistor connected to the gate line, the data line and the pixel electrode.

5. The array substrate according to claim 1, wherein the data pad terminal and the redundancy electrode are made of the same material as the pixel electrode.

6. The array substrate according to claim 5, wherein the data pad terminal, the redundancy electrode and the pixel electrode are made of a transparent conductive material.

7. The array substrate according to claim 1, wherein the data link line and the data pad are made of the same material as the data line.

8. The array substrate according to claim 1, wherein the redundancy line is made of the same material as the gate line.

9. The array substrate according to claim 8, wherein the first and second redundancy line contact holes extend through the gate insulating layer to the redundancy line.

10. The array substrate according to claim 1, wherein the redundancy line is made of the same material as the gate line.

11. The array substrate according to claim 1, wherein the redundancy line has first and second connection portions, the data pad has a concave portion adjacent to the first connection portion and the data link line has a protruding portion adjacent to the second connection portion.

12. The array substrate according to claim 11, wherein the first and second redundancy line contact holes and the data link line contact hole expose the first connection portion, the second connection portion and the protruding portion, respectively.

13. A fabricating method of an array substrate for a liquid crystal display device, comprising:
   forming a gate line on a substrate;
   forming a gate insulating layer on the gate line;
   forming a data line on the gate insulating layer, the data line crossing the gate line;
   forming a data link line extending from the data line;
   forming a data pad connected to the data link line;
   forming a redundancy line adjacent to the data link line;
   forming a passivation layer covering the data link line, the data pad and the redundancy line, the passivation layer having a data link line contact hole exposing the data link line, first and second redundancy line contact holes exposing the redundancy line and a data pad contact hole exposing the data pad;
   forming a data pad terminal connected to the data pad through the data pad contact hole and to the redundancy line through the first redundancy line contact hole;
   forming a redundancy electrode connected to the redundancy line through the second redundancy line contact hole and to the data link line through the data link line contact hole; and
   forming a pixel electrode on the passivation layer.

14. The method according to claim 13, further comprising forming a thin film transistor connected to the gate line, the data line and the pixel electrode.

15. The method according to claim 13, wherein the gate line is simultaneously formed with the redundancy line.

16. The method according to claim 13, wherein the data pad terminal and the redundancy electrode are simultaneously formed with the pixel electrode.

17. The method according to claim 13, wherein the data line, the data link line and the data pad are formed simultaneously of the same material.

18. A liquid crystal display device, comprising:
   a lower substrate including:
      a substrate,
      a gate line on the substrate,
      a gate insulating layer on the gate line,
      a data line on the gate insulating layer, the data line crossing the gate line,
      a data link line extending from the data line,
      a data pad connected to the data link line,
      a redundancy line adjacent to the data link line,
      a passivation layer covering the data link line, the data pad and the redundancy line, the passivation layer having a data link line contact hole exposing the data link line, first and second redundancy line contact holes exposing the redundancy line and a data pad contact hole exposing the data pad,
      a data pad terminal connected to the data pad through the data pad contact hole and to the redundancy line through the first redundancy line contact hole,
      a redundancy electrode connected to the redundancy line through the second redundancy line contact hole and to the data link line through the data link line contact hole, and
      a pixel electrode on the passivation layer;
   an upper substrate having a common electrode; and
   liquid crystal positioned between the upper and lower substrate.

19. The device according to claim 18, wherein the substrate has an active region where images are displayed, a pad region on a periphery of the active region and a link region being a border between the active region and the pad region.

20. The device according to claim 19, wherein the gate line is disposed in the active region, the data link line is disposed in the link region and the data pad is disposed in the pad region.

* * * * *